(12) United States Patent
Alvarez Viveros et al.

(10) Patent No.: US 11,084,431 B2
(45) Date of Patent: Aug. 10, 2021

(54) FRONT FASCIA FOR A VEHICLE

(71) Applicant: Nissan North America, Inc., Franklin, TN (US)

(72) Inventors: Victor Manuel Alvarez Viveros, Toluca (MX); Minerva Nieto Torres, Toluca (MX); Jorge Omar Zuñiga, Toluca (MX)

(73) Assignee: NISSAN NORTH AMERICA, INC., Franklin, TN (US)

( * ) Notice: Subject to any disclaimer, the term of this patent is extended or adjusted under 35 U.S.C. 154(b) by 127 days.

(21) Appl. No.: 16/591,316

(22) Filed: Oct. 2, 2019

(65) Prior Publication Data

US 2021/0101541 A1    Apr. 8, 2021

(51) Int. Cl.
   *B60R 13/00* (2006.01)
(52) U.S. Cl.
   CPC .................................. *B60R 13/005* (2013.01)
(58) Field of Classification Search
   CPC ......... B60R 19/18; B60R 19/24; B60R 19/34; B60R 2019/1886; B60R 2019/247; B60R 19/02; B60R 19/023; B60R 19/12; B60R 2019/1833
   USPC ...... 296/19.09, 187.09, 193.11, 203.02, 198, 296/210, 29, 35.1; 29/897.2, 428, 426.1, 29/525.11, 890.03
   See application file for complete search history.

(56) References Cited

U.S. PATENT DOCUMENTS

| | | | |
|---|---|---|---|
| 6,357,821 B1 * | 3/2002 | Maj ..................... | B60Q 1/0035 |
| | | | 296/193.09 |
| 8,744,743 B2 * | 6/2014 | Kawasaki ............ | H01Q 1/3283 |
| | | | 701/301 |
| 9,630,655 B1 * | 4/2017 | Lee ..................... | B62D 29/046 |
| 9,776,585 B2 * | 10/2017 | Wey ....................... | B60R 19/52 |
| 2011/0204680 A1 | 8/2011 | Fortin | |
| 2014/0132033 A1 * | 5/2014 | Townson ............. | B60K 11/085 |
| | | | 296/193.1 |
| 2016/0144900 A1 * | 5/2016 | Fortin ................. | B60Q 1/0408 |
| | | | 296/193.1 |
| 2019/0161041 A1 | 5/2019 | Fernandez et al. | |

* cited by examiner

*Primary Examiner* — D Glenn Dayoan
*Assistant Examiner* — Sunsurraye Westbrook
(74) *Attorney, Agent, or Firm* — Global IP Counselors, LLP

(57) ABSTRACT

A front fascia for a vehicle includes an upper fascia member, a lower fascia member, a connection member, and a temporary connection member. The connection member extends between the upper fascia member and the lower fascia member. The temporary connection member extends between the upper fascia member and the lower fascia member. The temporary connection member is configured to be removable prior to installation of the front fascia to the vehicle.

20 Claims, 11 Drawing Sheets

FRONT FASCIA FOR A VEHICLE

BACKGROUND

Field of the Invention

The present invention generally relates to a front fascia for a vehicle. More specifically, the present invention relates to a temporary connection member configured to be removable prior to installation of the front fascia to a vehicle.

Background Information

A front fascia for a vehicle is typically a decorative member made of plastic. Prior to installation on a vehicle, the front fascia can be difficult to manipulate and subject to sagging or other damaging movement due to the size and material thereof.

SUMMARY

An object of the disclosure is to provide a front fascia for a vehicle.

In view of the state of the known technology, one aspect of the present disclosure is to provide a front fascia for a vehicle. The front fascia includes an upper fascia member, a lower fascia member, a connection member, and a temporary connection member. The connection member extends between the upper fascia member and the lower fascia member. The temporary connection member extends between the upper fascia member and the lower fascia member. The temporary connection member is configured to be removable prior to installation of the front fascia to the vehicle.

Another aspect of the present invention includes a front fascia for a vehicle including an upper fascia member, a lower fascia member, a first connection member, a second connection member, and a temporary connection member. The first connection member extends between the upper fascia member and the lower fascia member. The second connection member extends between the upper fascia member and the lower fascia member. The temporary connection member extends between the upper fascia member and the lower fascia member. The temporary connection member is configured to be removable prior to installation of the front fascia to the vehicle.

Also other objects, features, aspects and advantages of the disclosed front fascia for a vehicle will become apparent to those skilled in the art from the following detailed description, which, taken in conjunction with the annexed drawings, discloses exemplary embodiments of the front fascia for a vehicle.

BRIEF DESCRIPTION OF THE DRAWINGS

Referring now to the attached drawings which form a part of this original disclosure.

DETAILED DESCRIPTION OF EXEMPLARY EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
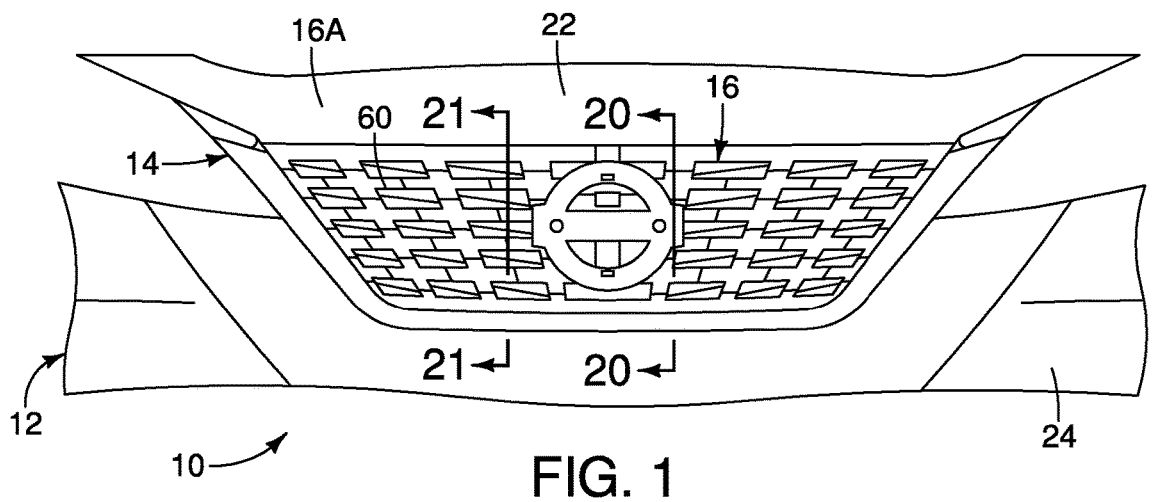
FIG. 1 is a front elevational view of a front fascia assembly for a vehicle in accordance with an exemplary embodiment of the present invention.
Figure 8:
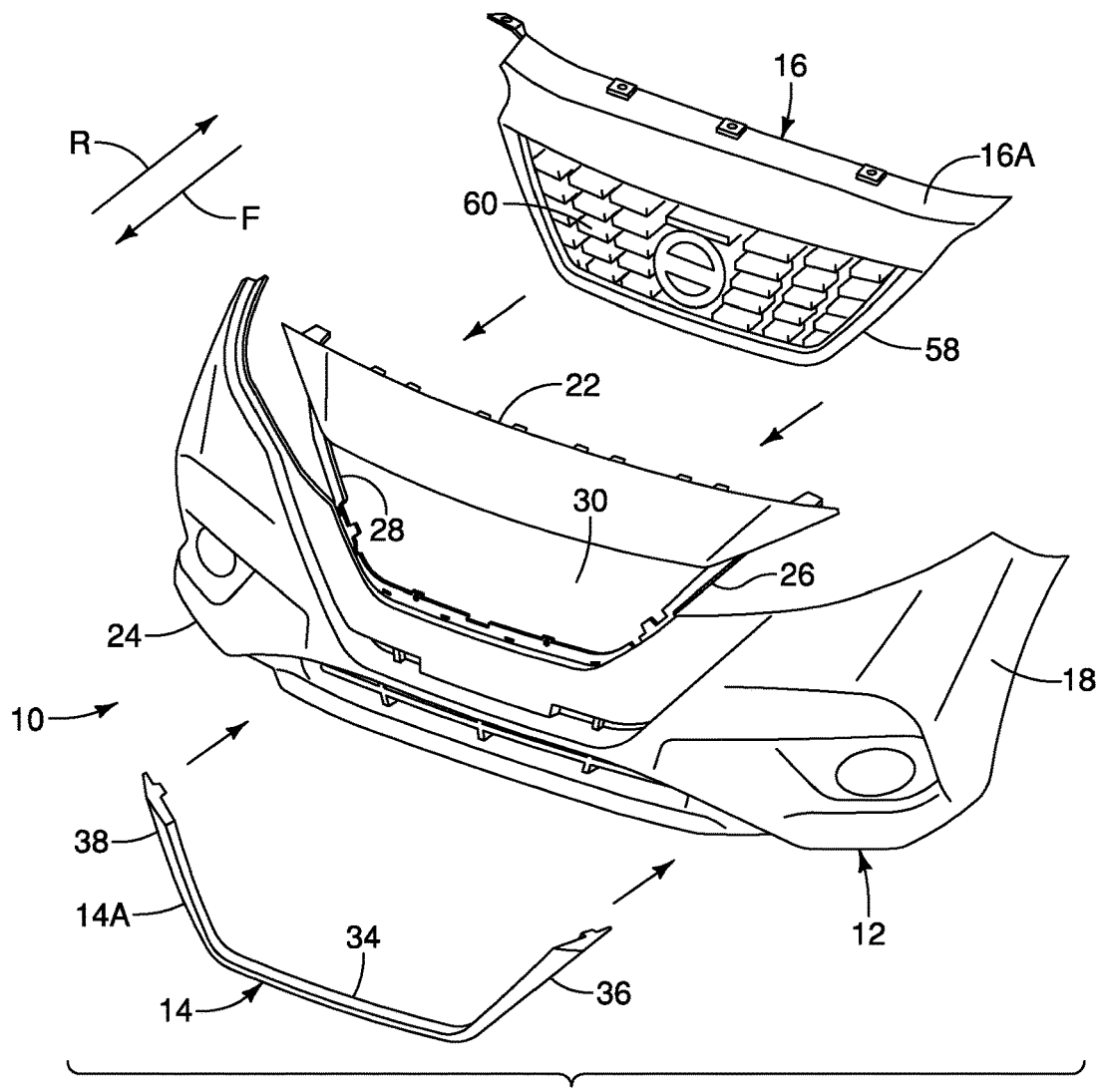
FIG. 8 is an exploded perspective view of the front fascia assembly after removal of a temporary connection member from the fascia.

Referring initially to FIGS. 1 and 8, a front fascia assembly 10 for a vehicle is illustrated in accordance with an exemplary embodiment of the present invention. The front fascia assembly 10 includes a front fascia 12, a support member 14, and a grille member 16. The support member 14 is removably connected to a front surface 18 of the front fascia. The grille member 16 is connected to a rear surface 20 (FIG. 13) of the front fascia 12 to securely retain the support member 14 to the front fascia 12. The support member 14 rigidly supports the front fascia 12 prior to installation to a vehicle. The front fascia 12, the support member 14, and the grille member 16 are preferably separate members.

Figure 2:
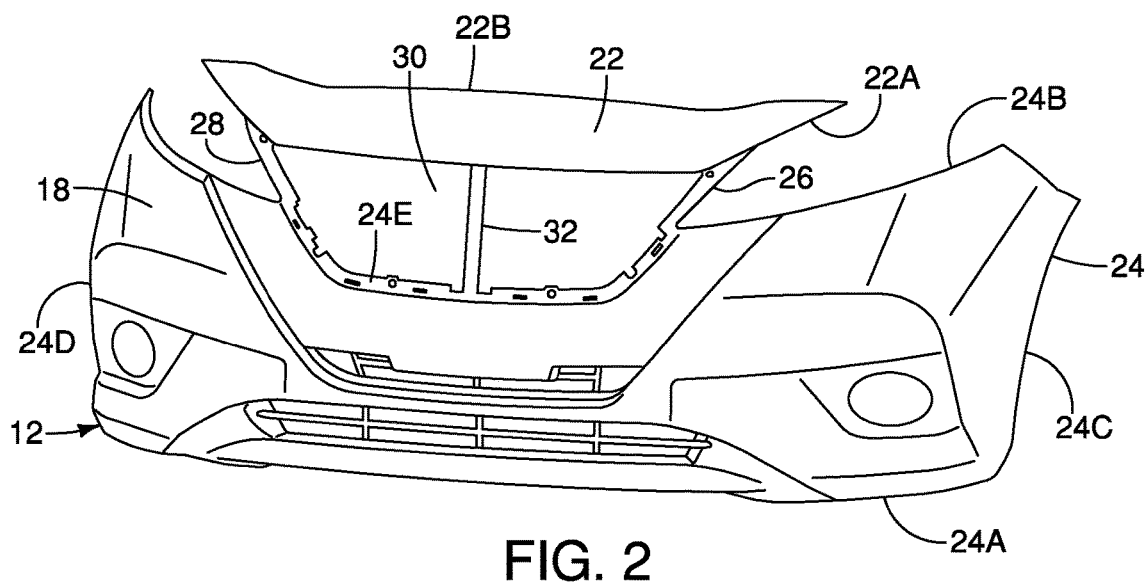
FIG. 2 is a perspective view of a front fascia of the front fascia assembly of FIG. 1 in which a temporary connection member extends between an upper fascia member and a lower fascia member.
Figure 3:
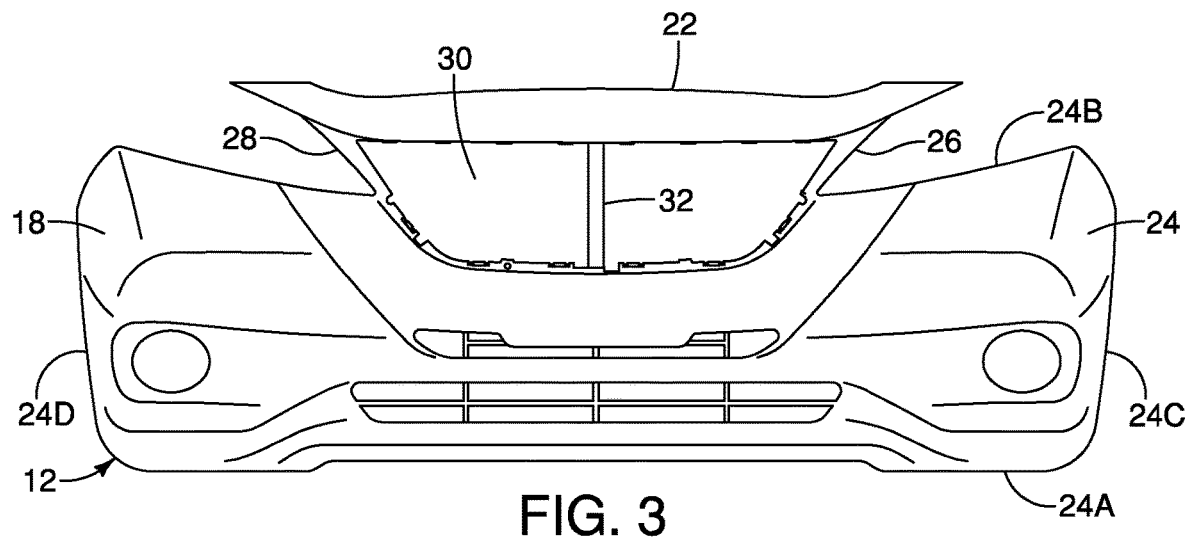
FIG. 3 is front elevational view of the front fascia of FIG. 2.
Figure 4:
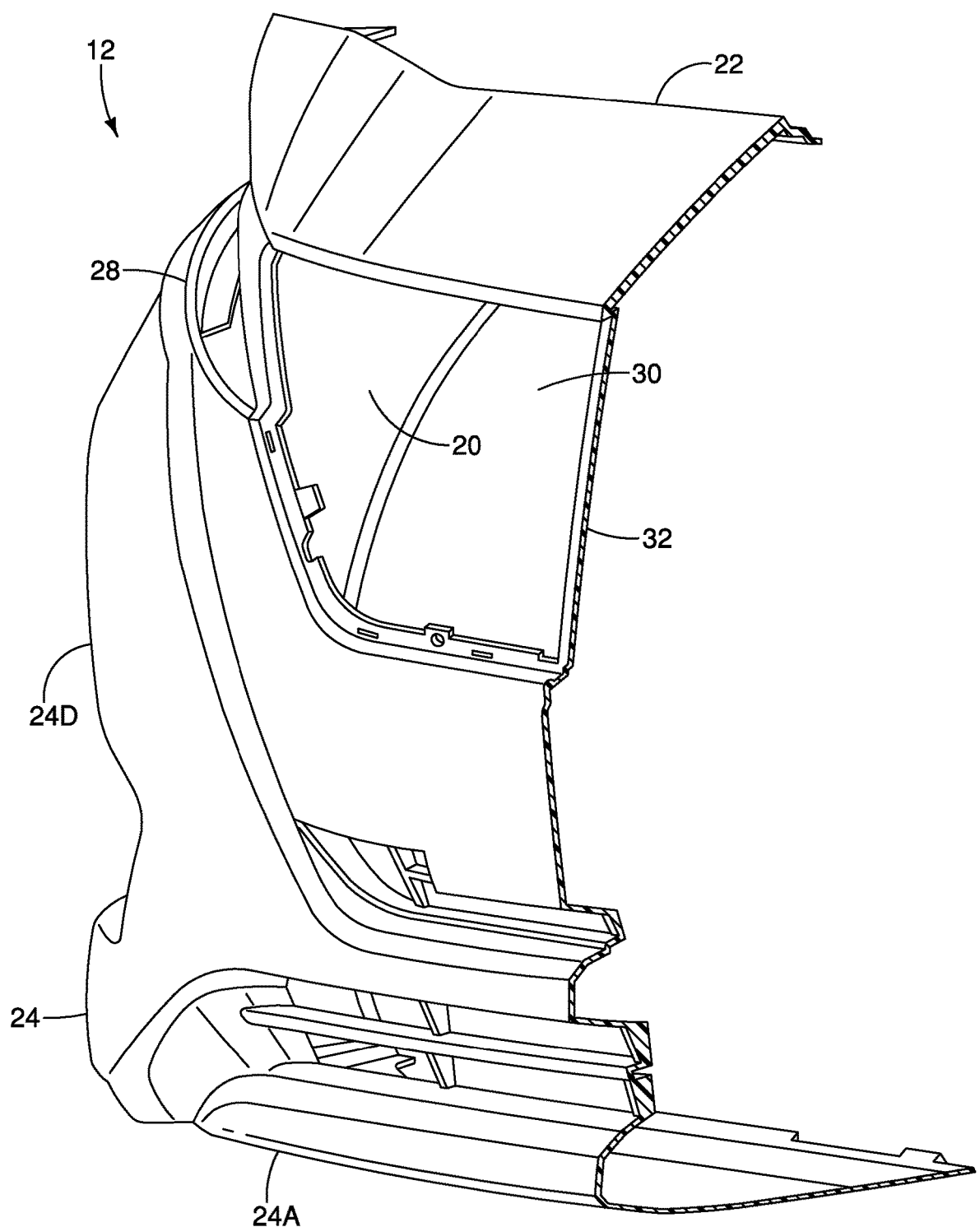
FIG. 4 is a perspective view in cross-section of the front fascia of FIG. 2.

The front fascia 12, as shown in FIGS. 2 and 3, includes an upper fascia member 22, a lower fascia member 24, and a first connection member 26 extending between the upper fascia member 22 and the lower fascia member 24. A second connection member 28 extends between the upper fascia member 22 and the lower fascia member 24.

The upper fascia member 22 has a lower edge 22A and an upper edge 22B that define a perimeter of the upper fascia member 22. The lower fascia member 24 has a lower edge 24A, an upper edge 24B, and oppositely disposed side edges 24C and 24D that define a perimeter of the lower fascia member 24. The side edges 24C and 24D extend between respective ends of the lower and upper edges 24A and 24B. The upper edge 24B of the lower fascia member 24 has a recessed portion 24E that is centrally disposed along the upper edge 24B.

The first and second connection members 26 and 28 extend between the upper and lower fascia members 22 and 24, as shown in FIGS. 1-4 and 10. The first connection member 26 has an outer surface 26A and an inner surface 26B. The second connection member 28 has an outer surface 28A and an inner surface 28B. The outer surfaces 26A and 28A face a forward direction F (FIG. 8) of the vehicle, and the inner surfaces 26B and 28B faces a rearward direction R (FIG. 8) of the vehicle. The first and second connection members 26 and 28 extend from ends of the recessed portion 24E of the lower fascia member 24 toward the upper fascia member 22. The first and second connection members 26 and 28 extend in different directions from the lower fascia member 24. In other words, the first connection member 26 extends upwardly to the right from the lower fascia member 24, as shown in FIG. 3, and the second connection member 28 extends upwardly to the left from the lower fascia member 24. The first connection member 26 is not parallel to the second connection member 28.

Figure 7:
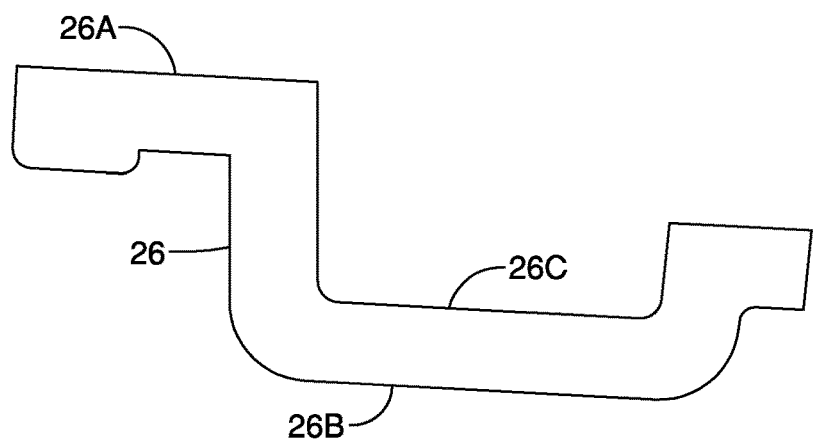
FIG. 7 is a side elevational view in cross section of a connection member of the front fascia of FIG. 2.

As shown in FIG. 7, the first connection member 26 has a groove 26C extending along a length thereof. The groove 26C faces a forward direction F (FIG. 8) of the vehicle. The second connection member 28 is similarly configured.

An opening 30 in the front fascia 12 is defined by the front fascia 12 by lower edge 22A of the upper fascia member 22, the upper edge 24B of the lower fascia member 24, and the first and second connection members 26 and 28. More preferably, the opening 30 is defined by the front fascia 12 by lower edge 22A of the upper fascia member 22, the recessed portion 24E of the upper edge 24B of the lower fascia member 24, and the first and second connection members 26 and 28. As shown in FIG. 3, the opening 30 is centered in a lateral direction of the front fascia 12.

Figure 5:
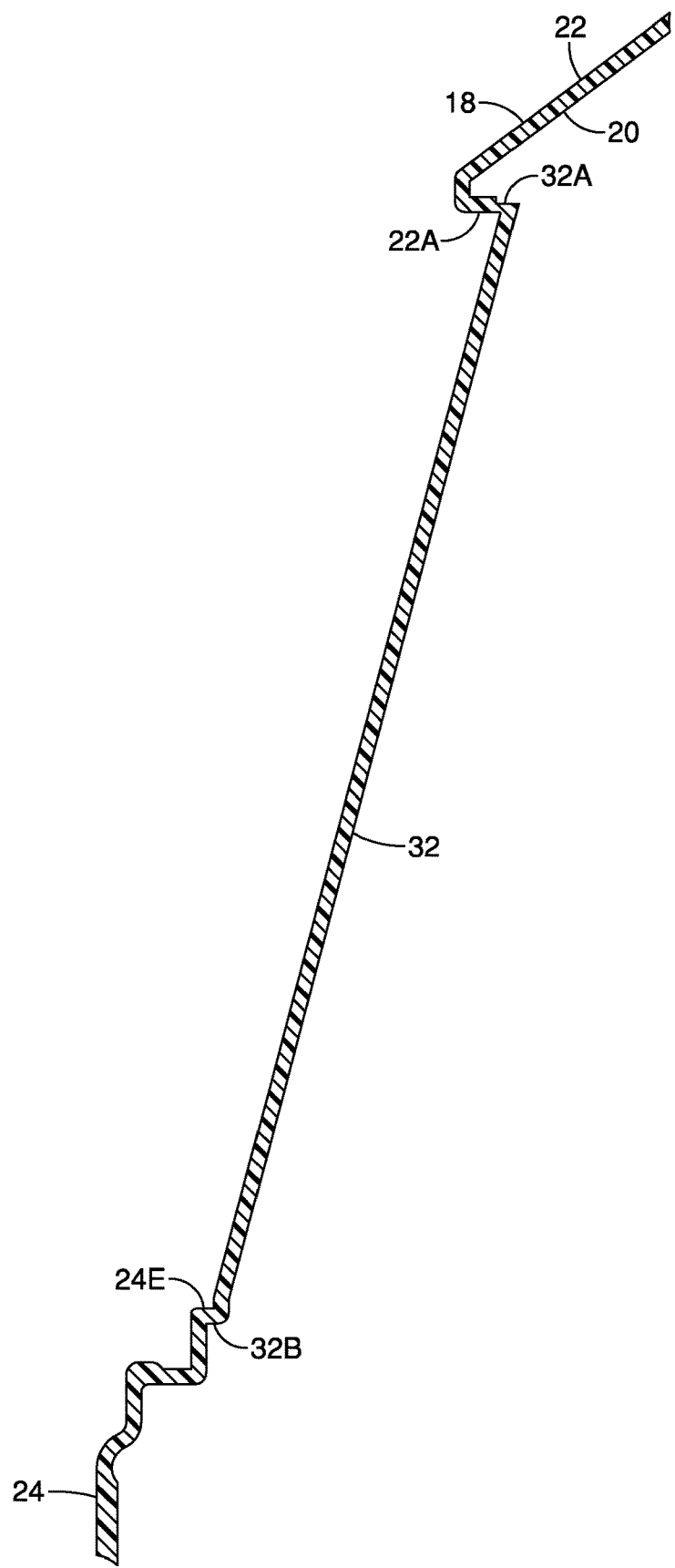
FIG. 5 is a partial side elevational view in cross section of the front fascia of FIG. 2.
Figure 6:
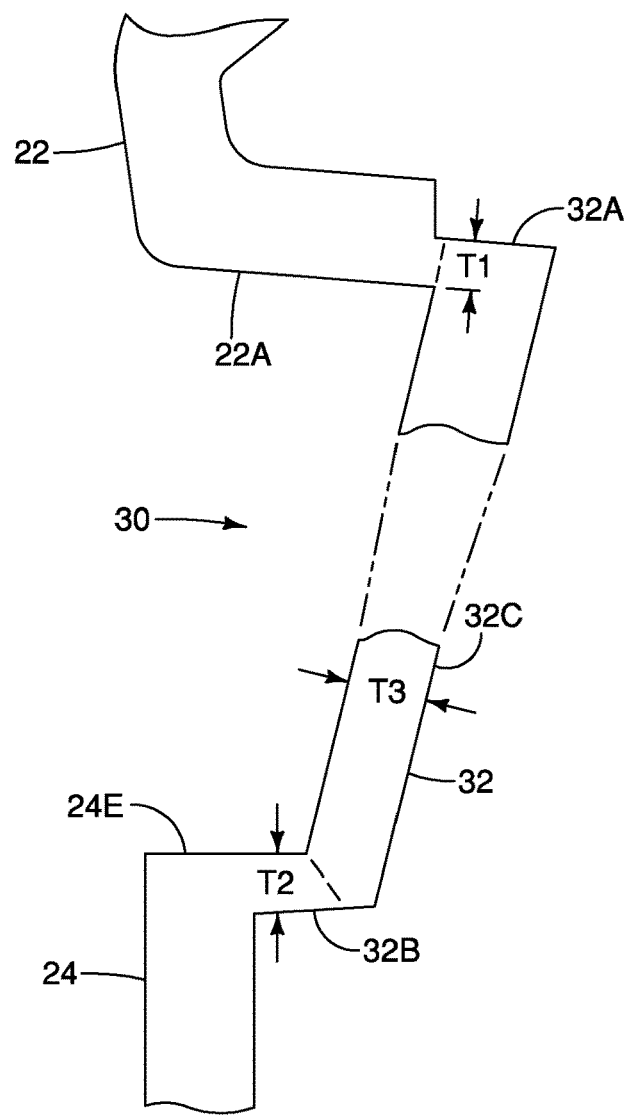
FIG. 6 is an enlarged side elevational view in cross section of the temporary connection member of the front fascia of FIG. 5.

A temporary connection member 32 extends between the upper fascia member 22 and the lower fascia member 24, as shown in FIGS. 2-6. The temporary connection member 32 extends between the lower edge 22A of the upper fascia member 22 and the upper edge 24B of the lower fascia member 24. More preferably, the temporary connection member 32 extends between the lower edge 22A of the upper fascia member 22 and the recessed portion 24E of the upper edge 24B of the lower fascia member 24. The temporary connection member 32 has a first portion 32A having a reduced thickness proximal the upper fascia member 22 and a second portion 32B having a reduced thickness proximal the lower fascia member 24. The first portion 32A has a thickness T1 and the second portion 32B has a thickness T2, as shown in FIG. 6. A central portion 32C of the temporary connection member 32 between the upper and lower fascia members 22 and 24 has a thickness T3. The thicknesses T1 and T2 of the first and second portions 32A and 32B, respectively, are each less than the thickness T3 of the central portion 32C. As shown in FIGS. 5 and 6, the first reduced thickness portion 32A is disposed rearwardly of the second reduced thickness portion 32B in a longitudinal direction of the vehicle As shown in FIG. 3, in a front elevational view of the front fascia 12, the temporary connection member 32 extends substantially vertically between the upper and lower fascia members 22 and 24. The temporary connection member 32 is substantially centered with respect to a length of the upper fascia member 22. The temporary connection member 32 is substantially centered with respect to a length of the lower fascia member 24. The temporary connection member 32 is preferably not parallel to either the first or second connection members 26 and 28.

The temporary connection member 32 rigidly supports the upper and lower fascia members 22 and 24. The temporary connection member 32 is disposed between the first and second connection members 26 and 28 to further support the upper and lower fascia members 22 and 24. The temporary connection member 32 substantially prevents movement of the upper fascia member 22 relative to the lower fascia member 24, such as sagging or separation of the upper fascia member 22 from the lower fascia member 24, prior to installation of the fascia member 12 to the vehicle. The temporary connection member 32 further prevents damage to the first and second connection members 26 and 28, such as the first and second connection members bending or breaking.

The temporary connection member 32 is configured to be removable prior to installation of the front fascia 12 to the vehicle. The reduced thickness portions T1 and T2 facilitate removal of the temporary connection member 32 from the upper and lower fascia members 22 and 24 prior to installation of the front fascia to the vehicle. Preferably, the temporary connection member 32 is removable from the upper and lower fascia members 22 and 24 without a tool. The reduced thickness portions T1 and T2 of the first and second portions 32A and 32B can be scored, perforated or other suitable means to facilitate separating the temporary connection member 32 from the upper and lower fascia members 22 and 24. The temporary connection member 32 is preferably made of a plastic material, such as polypropylene, such that the removed temporary connection member 32 can be recycled. As shown in FIG. 8, the temporary connection member 32 is preferably removed prior to connection of the grille member 16.

Figure 10:
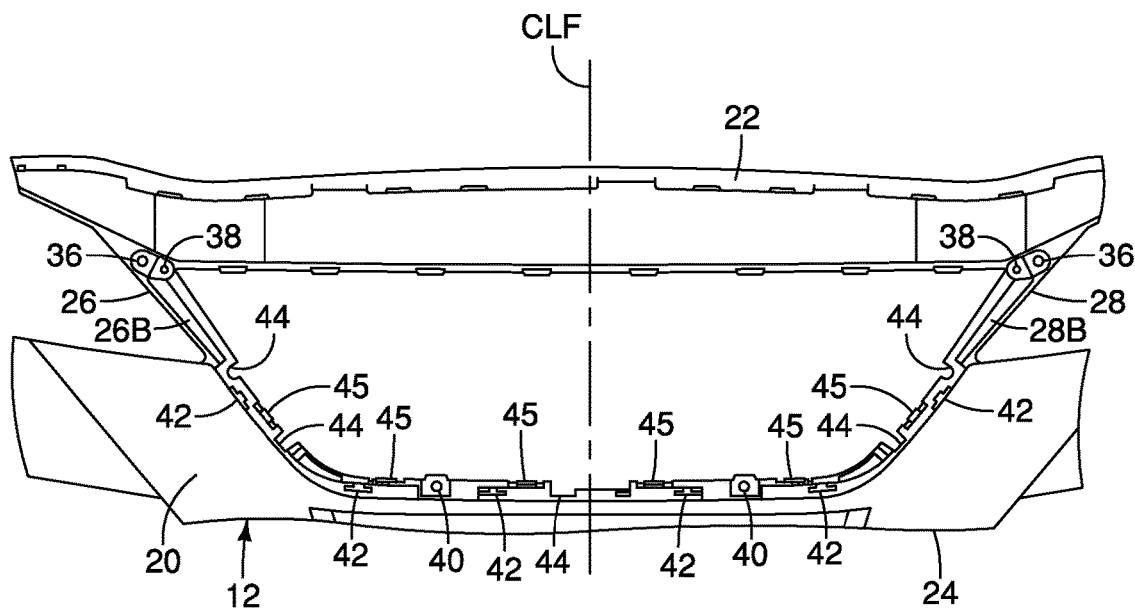
FIG. 10 is a rear elevational view of the front fascia of FIG. 2.

The rear surface 20 of the front fascia 12 includes first, second and third mounting holes 36, 38 and 40, as shown in FIG. 10, to facilitate securely retaining the support member 14 and the grille member 16 thereto. The first mounting hole 36 is disposed proximal the upper fascia member 22. Preferably, there are two first mounting holes 36 disposed on opposite sides of the opening 30. The second mounting hole 38 is disposed adjacent the first mounting hole 36, such that the second mounting hole 38 is disposed between the first mounting hole 36 and the opening 30. Preferably, there are two second mounting holes 38 disposed on opposite sides of the opening 30. The first and second mounting holes 36 and 38 are disposed in the first and second connection members 26 and 28. The third mounting hole 40 is disposed proximal the lower fascia member 24. Preferably, there are two third mounting holes 40 disposed on opposite sides of the centerline CLF of the fascia member 12. Each of the first, second and third mounting holes 36, 38 and 40 extends completely through the front fascia from the front surface 18 to the rear surface 20.

A plurality of slots 42 are disposed in the lower fascia member 24, as shown in FIG. 10. The slot 42 has a recessed portion 42A centered on the slot. The recessed portion 42A of the slot 42 extends toward the opening 30 in the front fascia 12. Six slots 42 are shown, with three slots being disposed on each side of the centerline CLF of the fascia member 12. However, the front fascia 12 can have any suitable number of slots 42. Each slot 42 is configured substantially similarly. The plurality of slots 42 extend completely through the front fascia 12 from the front surface 18 to the rear surface 20.

A plurality of cut-outs 44 are formed in the front fascia 12, as shown in FIG. 10. The cut-outs 44 are formed in the lower fascia member 24 on an inner periphery defining the opening 30. The cut-outs 44 are formed in positions to allow the support member 14 and the grille member 16 to be directly connected together without being received by or engaging the front fascia 12.

A plurality of mounting tabs 45 extend rearwardly from the rear surface 20 of the front fascia 12, as shown in FIG. 10. The front fascia 12 is shown having six mounting tabs 45, with three mounting tabs 45 being disposed on each side of the fascia centerline CLF, although the front fascia 12 can have any suitable number of mounting tabs 45. The plurality of mounting tabs 45 extend rearwardly from the lower fascia member 24 of the front fascia 12.

The upper fascia member 22, the lower fascia member 24, the first and second connection members 26 and 28, and the temporary connection member 32 are integrally formed as a single member. For example, the upper fascia member 22, the lower fascia member 24, the first and second connection members 26 and 28, and the temporary connection member 32 are integrally formed as a single member by injection molding. The front fascia 12 is made of any suitable material, such as a plastic material, such as polypropylene.

Figure 11:
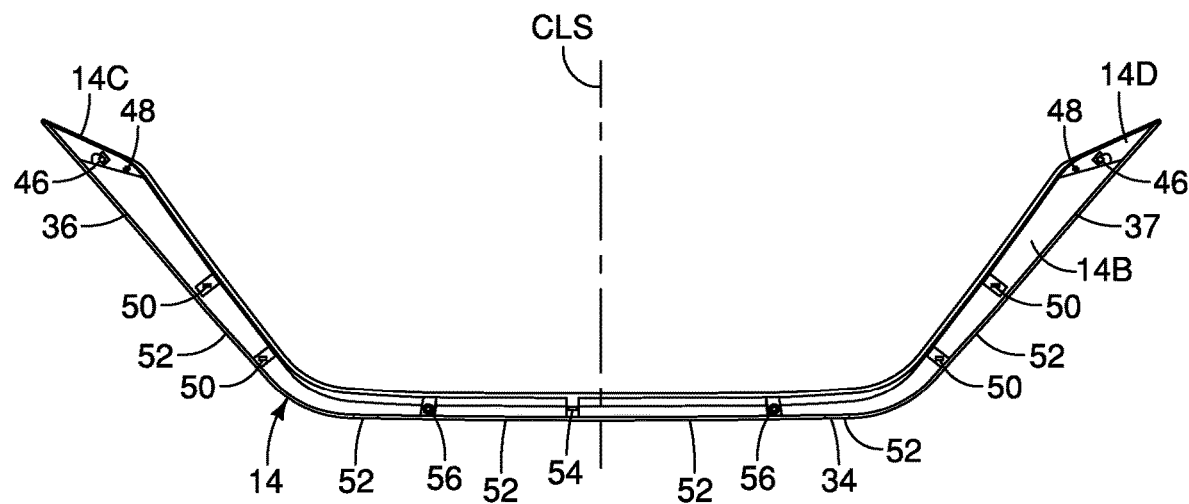
FIG. 11 is a rear elevational view of a support member.

The support member 14 has a front surface 14A and a rear surface 14B, as shown in FIGS. 8 and 11. The support member is preferably formed as a single, one-piece member. The support member 14 is made out of any suitable material, such as a chrome plated metallic material.

The support member 14 has a first leg 34 having first and second ends, as shown in FIG. 8. A second leg 36 extends upwardly from the first end of the first leg 34, and a third leg 37 extends upwardly from the second end of the first leg 34. The second and third legs 36 and 37 extend in opposite directions from the first leg 34. In other words, the second leg 36 extends to the right, and the third leg 37 extends to the left. Preferably, the second and third legs 36 and 37 are substantially parallel to the first and second connection members 26 and 28 when the support member is connected to the front fascia 12. The support member 14 is preferably substantially U-shaped.

Figure 14:
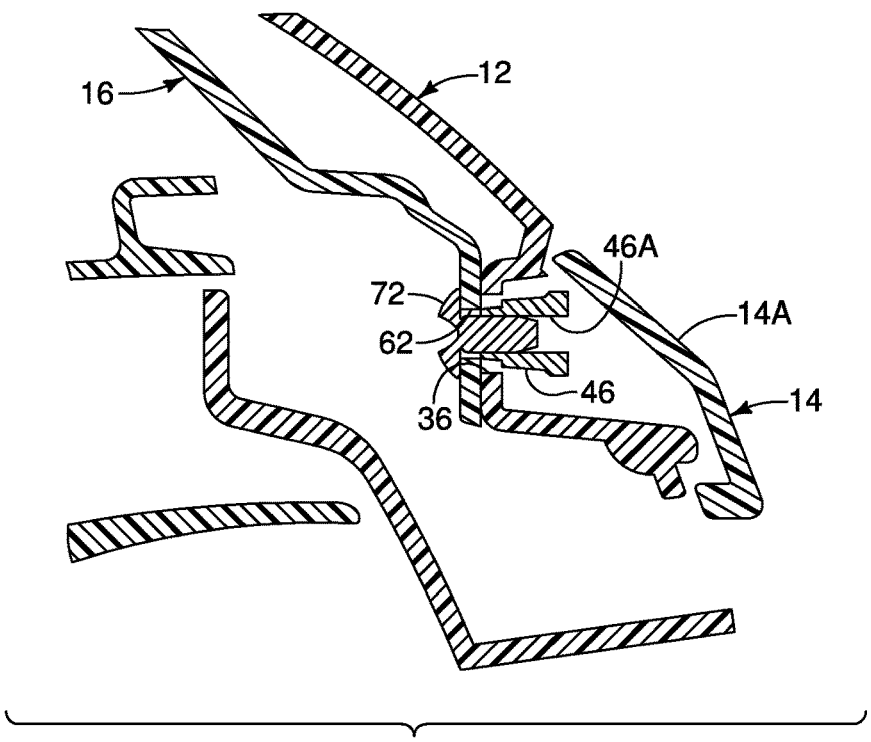
FIG. 14 is an elevational view in cross section taken along line 14-14 of the front fascia assembly of FIG. 13.

A rear surface 14B of the support member 14 includes an outwardly extending first mounting boss 46, as shown in FIG. 11. The first mounting boss 46 has an internally threaded opening 46A, as shown in FIG. 14. Preferably, the support member 14 has two first mounting bosses 46, with one mounting boss 46 extending from each of the second and third legs 36 and 37, although the support member 14 can have any suitable number of first mounting bosses 46.

Figure 15:
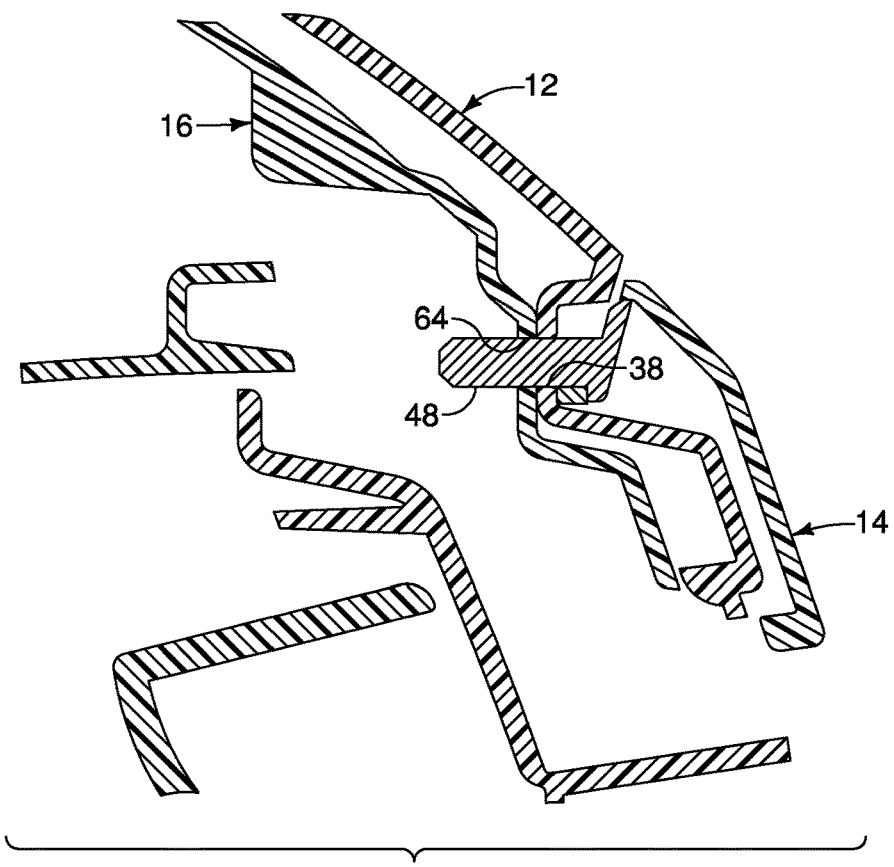
FIG. 15 is an elevational view in cross section taken along line 15-15 of the front fascia assembly of FIG. 13.

A first locating member 48 extends outwardly from the rear surface 14B of the support member 14, as shown in FIGS. 11 and 15. The first locating member 48 is disposed adjacent the first mounting boss 46. The first locating member 48 is disposed between the opening 30 and the first mounting boss 46 when the support member 14 is connected to the front fascia 12. Preferably, the support member has two first locating members 48, with one first locating member extending from each of the second and third legs 36 and 37 of the support member 14, although the support member 14 can have any suitable number of first locating members 48.

Figure 16:
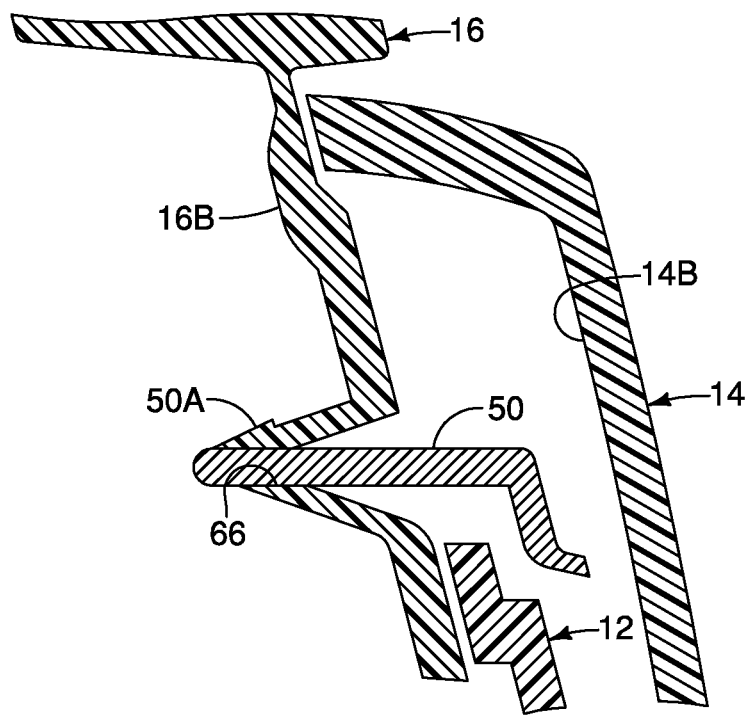
FIG. 16 is an elevational view in cross section taken along line 16-16 of the front fascia assembly of FIG. 13.
Figure 17:
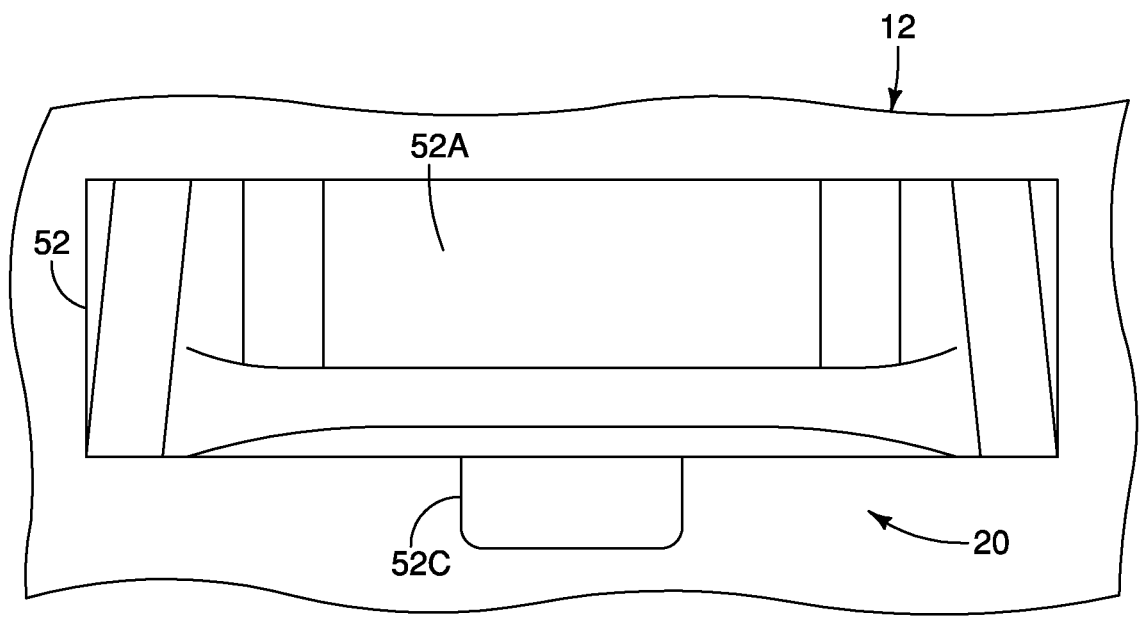
FIG. 17 is a front elevational view in cross section taken along line 17-17 of FIG. 1.

A first mounting tab, or attachment member, 50 extends outwardly from the rear surface 14B of the support member 14, as shown in FIGS. 11 and 16. Preferably, the support member 14 has four first mounting tabs 50, with two first mounting tabs 50 extending from each of the second and third legs 36 and 37 of the support member 14, although the support member 14 can have any suitable number of first mounting tabs 50. A hook 50A is disposed at the end of the first mounting tab 50.

Figure 18:
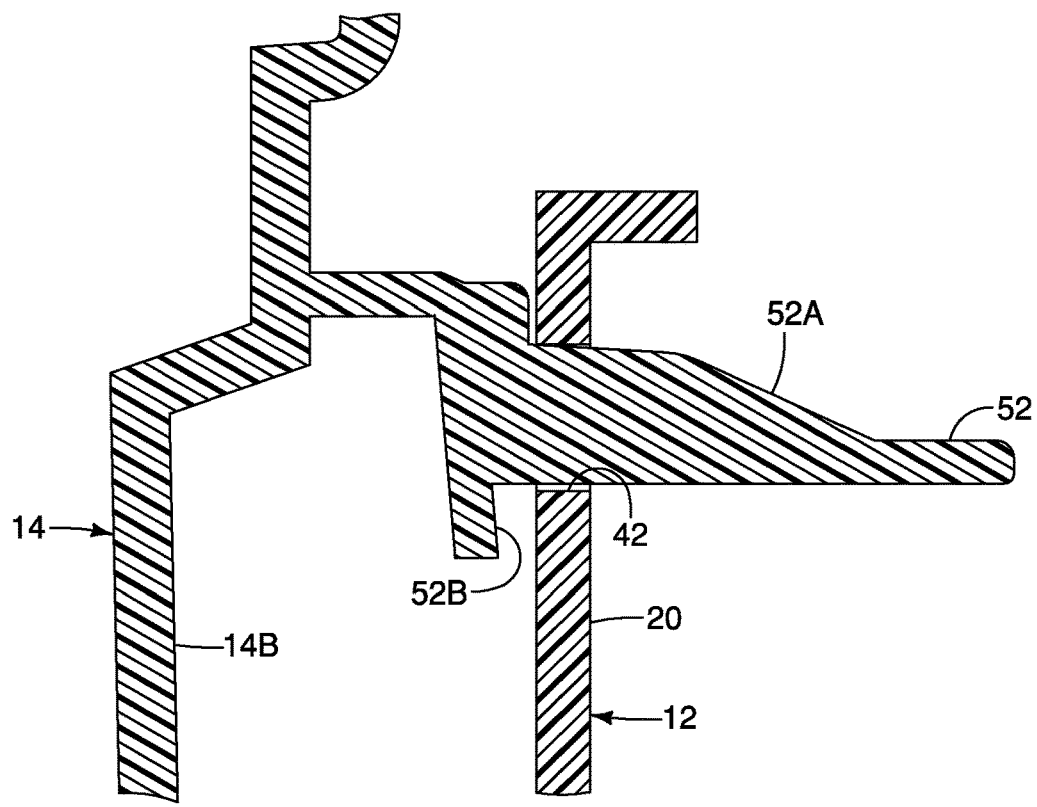
FIG. 18 is a side elevational view in cross section taken along line 18-18 of the front fascia assembly of FIG. 16.
Figure 19:
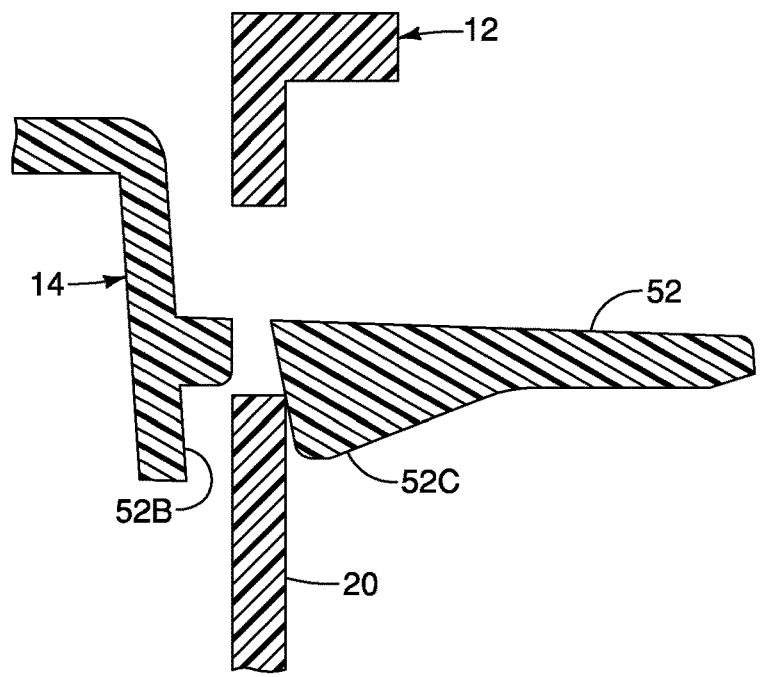
FIG. 19 a side elevational view in cross section taken along line 19-19 of the front fascia assembly of FIG. 16.

A second mounting tab, or attachment member, 52 extends outwardly from the rear surface 14B of the support member 14, as shown in FIGS. 11 and 17-19. Preferably, the support member 14 has six second mounting tabs 52, with three of the second mounting tabs 52 being disposed on each side of the support member centerline CLS, although the support member 14 can have any suitable number of second mounting tabs 52. Each of the plurality of mounting tabs 52 extends outwardly from the rear surface 14B of the first leg 34 of the support member 14. The second mounting tab 52 has a first ramped surface 52A, as shown in FIG. 18, to facilitate insertion in the slots 42 of the front fascia 12. A stop member 52B extends downwardly from the second mounting tab 52 to limit an insertion depth of the second mounting tab 52. A hook 52C of the second mounting tab 52 is configured to engage the rear surface 20 of the front fascia 12, as shown in FIG. 19 to prevent accidental withdrawal of the second mounting tab 52 from the slot 42 in the front fascia 12. The ramped surface 52A and the hook 52C are disposed on opposite surfaces of the second mounting tab 52. Each of the second mounting tabs 52 is similarly configured.

Figure 20:
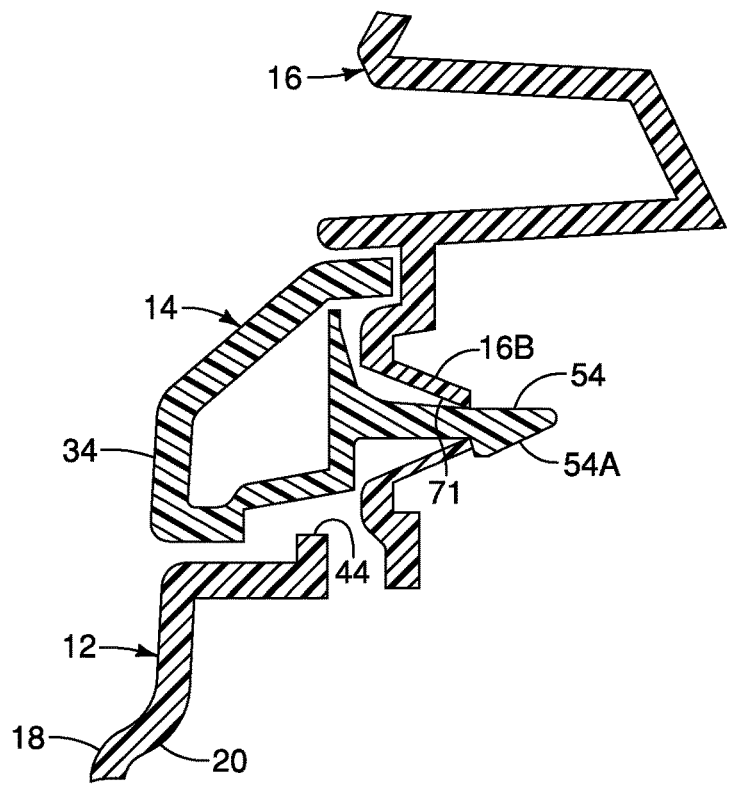
FIG. 20 is a side elevational view in cross section taken along line 20-20 of the front fascia assembly of FIG. 1.

A third mounting tab, or attachment member, 54 extends outwardly from the rear surface 14B of the support member 14, as shown in FIGS. 11 and 20. As shown in FIG. 11, the third mounting tab 14 extends outwardly from the rear surface 14B of the first leg 34 of the support member 14. The third mounting tab 54 has a flexible hook 54A to prevent accidentally removal of the third mounting tab 54 from the grille member 16, as shown in FIG. 20. Although the support member 14 is shown having one third mounting tab 54, the support member 14 can have any suitable number of third mounting tabs 54.

Figure 21:
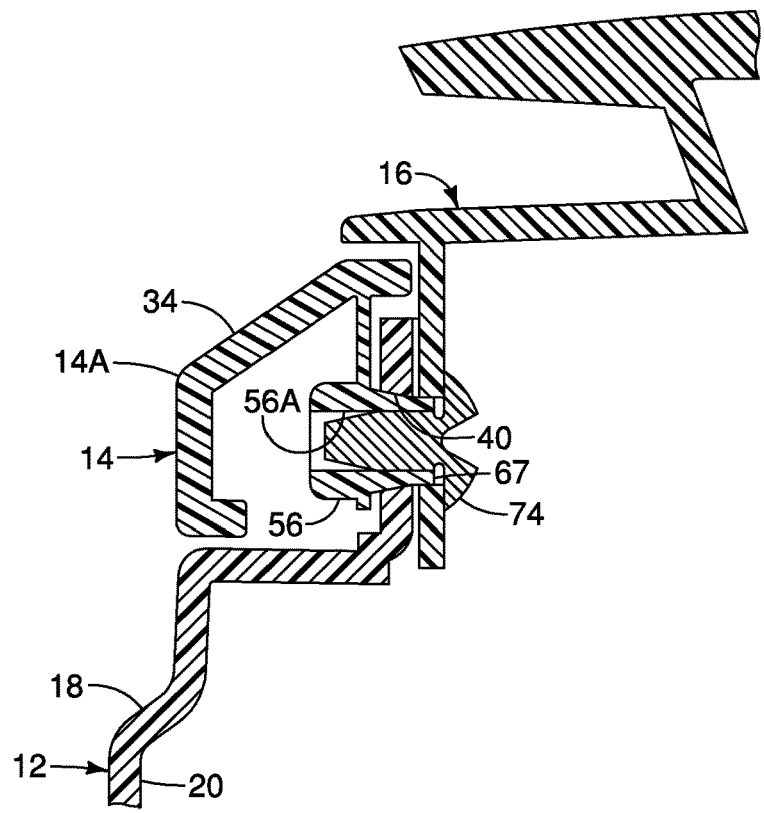
FIG. 21 is a side elevational view in cross section taken along line 21-21 of the front fascia assembly of FIG. 1.

A second mounting boss 56 extends outwardly from the rear surface 14B of the support member 14, as shown in FIGS. 11 and 21. Preferably, two second mounting bosses 56 extend outwardly from the rear surface 14B of the support member 14. The two second mounting bosses 56 are disposed on opposite sides of a centerline CLS of the support member 14, as shown in FIG. 11. The second mounting boss 56 extends from the first leg 34 of the support member 14. The second mounting boss 56 has an internally threaded opening 56A to facilitate receiving a fastener. Each of the second mounting bosses 56 is similarly configured. Although the support member 14 is shown having two second mounting bosses 56, the support member 14 can have any suitable number of second mounting bosses 56.

Figure 13:
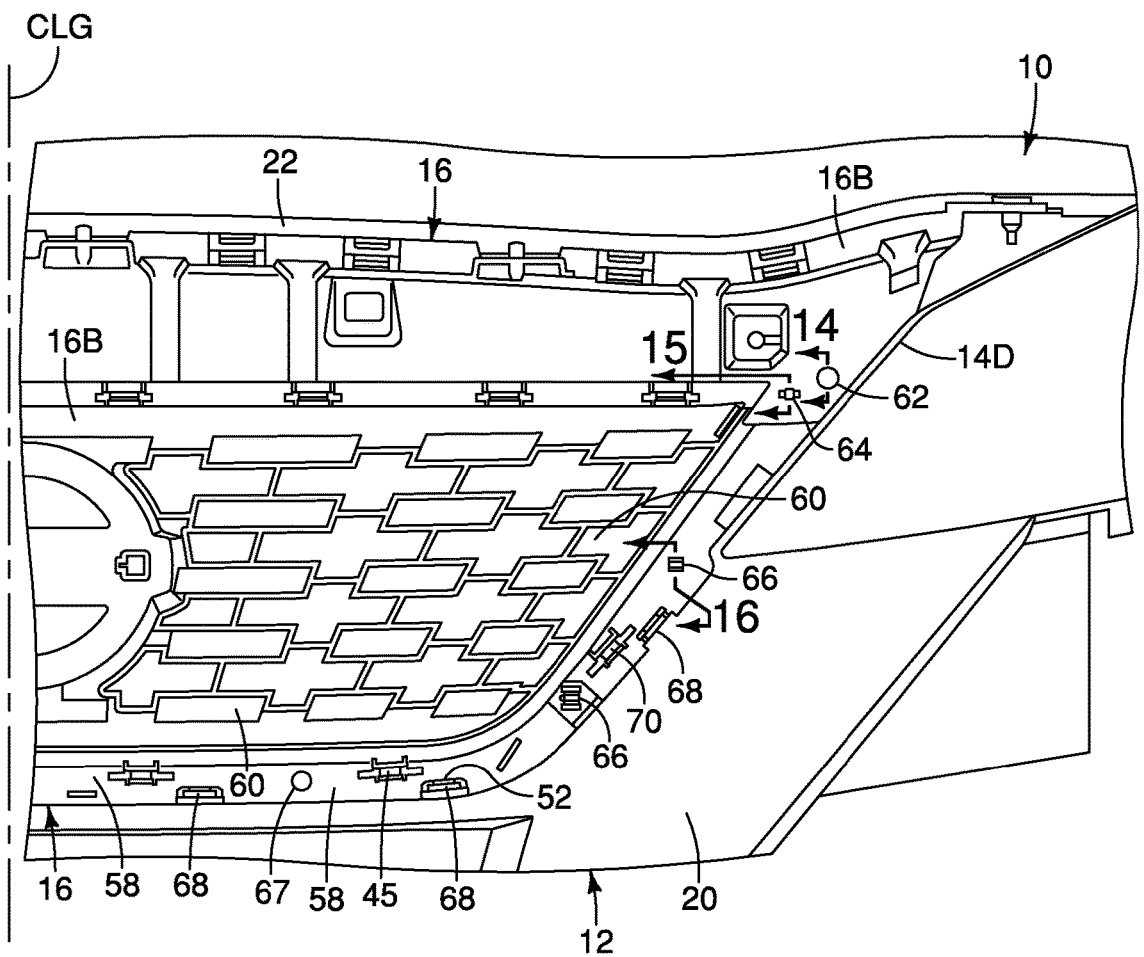
FIG. 13 is a rear elevational view of the grille member connected to the support member and the front fascia of FIG. 12.

The grille member 16 has a peripheral support portion 58 surrounding a grille portion 60, as shown in FIGS. 8 and 13. The grille member 16 has a front surface 16A and a rear surface 16B. The front surface 16A of the grille member 16 faces in the forward direction F of the vehicle, and the rear surface 16B of the grille member 16 faces in the rearward direction R of the vehicle, as shown in FIGS. 8 and 13. The grille member 16 is made out of any suitable material, such as a rigid plastic material.

The grille member 16 includes first, second, third and fourth mounting holes 62, 64, 66 and 67 disposed in the peripheral support portion 58, as shown in FIG. 13, to facilitate securely retaining the front fascia 12 and the support member 14 thereto. The first mounting hole 62 is configured to be aligned with the first mounting hole 36 of the fascia member 12 when the front fascia assembly 10 is assembled. Preferably, there are two first mounting holes 62, with one first mounting hole 62 being disposed on each side of the grille member centerline CLG. The second mounting hole 64 is disposed adjacent the first mounting hole 62, such that the second mounting hole 64 is disposed between the first mounting hole 62 and the opening 30. The second mounting hole 64 is configured to be aligned with the second mounting hole 38 of the front fascia 12 when the front fascia assembly 10 is assembled. Preferably, there are two second mounting holes 64, with one second mounting hole being disposed on each side of the grille member centerline CLG. The third mounting hole 66 is configured to be aligned with the cut-outs 44 of the front fascia 12 and the first mounting tabs 50 of the support member 14. Preferably, there are four third mounting holes 40, with two third mounting holes being disposed on each side of the centerline CLG of the grille member 16. The fourth mounting hole 67 is configured to be aligned with the third mounting hole 40 of the front fascia 12. Preferably, there are two fourth mounting holes 67, with two third mounting holes 67 being disposed on each side of the centerline CLG of the grille member 16. Each of the first, second, third and fourth mounting holes 62, 64, 66 and 67 extends completely through the grill member 16 from the front surface 16A to the rear surface 16B.

A plurality of first slots 68 are disposed in the peripheral support portion 58 of the grille member 16, as shown in FIG. 13. The first slots 68 extend completely through the grille member 16 from the front surface 16A to the rear surface 16B. Preferably, there are six first slots 68, with three first slots 68 being disposed on each side of the grille member centerline CLG. The first slots 68 are configured to be aligned with the second mounting tabs 52 of the support member 14 when the front fascia assembly 10 is assembled, as shown in FIG. 13.

A plurality of second slots 70 are disposed in the peripheral support portion 58 of the grille member 16, as shown in FIG. 13. The second slots 70 extend completely through the grille member 16 from the front surface 16A to the rear surface 16B. Preferably, there are six second slots 70, with three second slots 70 being disposed on each side of the grille member centerline CLG. The second slots 70 are configured to be aligned with the mounting tabs 45 of the front fascia 12 when the front fascia assembly 10 is assembled, as shown in FIG. 13.

A third mounting slot 71 is disposed in the peripheral support portion 58 of the grille member 16, as shown in FIGS. 13 and 20. The third mounting slot 71 extends completely through the grille member 16 from the front surface 16A to the rear surface 16B. The third mounting slot 71 is configured to be aligned with the third mounting tab 54 of the support member 14 when the front fascia assembly 10 is assembled, as shown in FIGS. 13 and 20. The third mounting tab 54 is configured to pass through one of the cut-outs 44 in the front fascia 12 such that the third mounting tab 54 is not received by the front fascia 12 when the front fascia assembly 10 is assembled.

Figure 9:
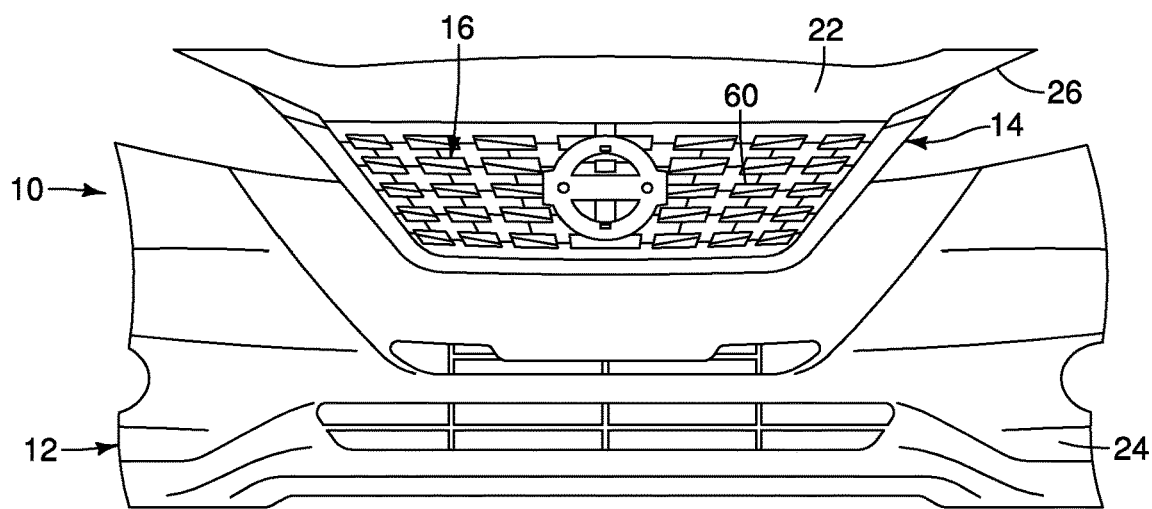
FIG. 9 is a front elevational view of the assembled front fascia assembly of FIG. 8.

To assemble the front fascia assembly 10, as shown in FIGS. 1, 8 and 9, the support member 14 is attached from the front surface side of the front fascia 12, and the grille member 16 is attached from the rear surface side of the front fascia 12. As shown in FIG. 8, the temporary connection member 32 is removed from the front fascia 12 prior to attaching the support member 14 and the grille member 16. The reduced thickness of the first and second portions 32A and 32B facilitates removing the temporary connection member 32 from the upper and lower fascia members 22 and 24. As shown in FIG. 8, the opening 30 in the front fascia 12 is unobstructed after removing the temporary connection member 32. In other words, the front fascia 12 has no structure passing through the opening 30 after removing the temporary connection member 32. As shown in FIG. 8, the first and second connection members 26 and 28 are not removed from the front fascia 12.

The support member 14 is then attached to the front fascia 12 from the front surface side of the front fascia, as shown in FIGS. 1, 8 and 9. The support member 14 supports the front fascia 12 after removal of the temporary connection member 32.

Figure 12:
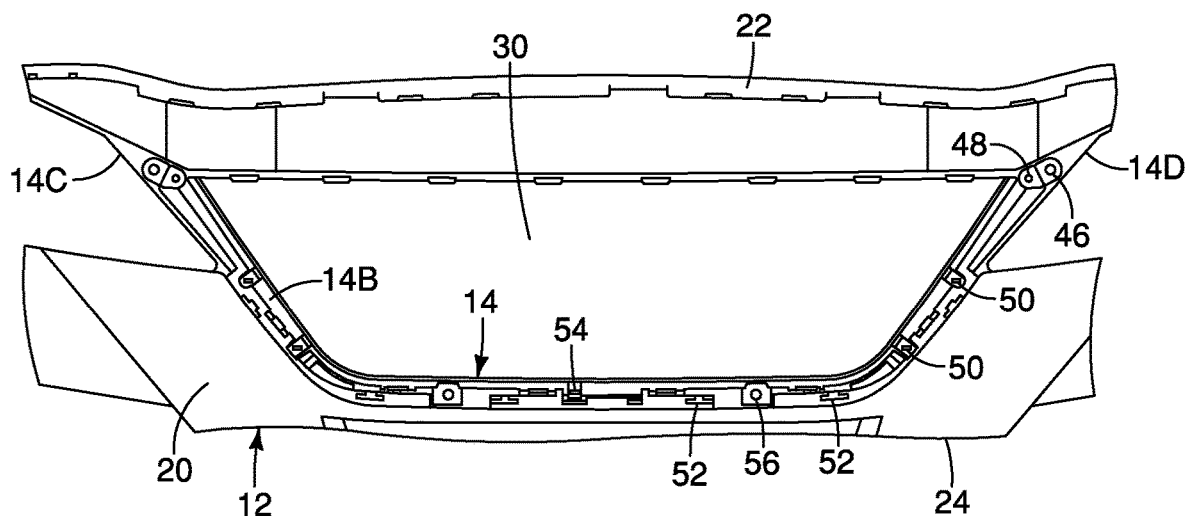
FIG. 12 is a rear elevational view of the support member of FIG. 11 connected to the front fascia of FIG. 10.

The first mounting bosses 46 of the support member 14 are aligned with the first mounting holes 36 of the front fascia 12, as shown in FIG. 14, such that the internally threaded opening 46A of the first mounting boss 46 is aligned with the first mounting hole 36. The first locating member 48 of the support member 14 is received by the second mounting hole 38 of the front fascia 12, as shown in FIGS. 12 and 15. The first locating member 48 facilitates positioning the support member 14 with respect to the front fascia 12.

The first mounting tabs 50 of the support member 14 are received by cut-outs 44 in the front fascia 12, as shown in FIG. 12, such that the first mounting tabs 50 do not engage the front fascia 12.

The second mounting tabs 52 of the support member 14 are received by the slots 42 in the front fascia 12, as shown in FIGS. 12, 18 and 19. The first ramped surface 52A of the second mounting tab 52 facilitates inserting the second mounting tab 52 through the slot 42. The hook 52C in the second mounting tab 52 engages the slot 42 in the front fascia 12. The hook 52C flexes through the slot 42 and engages the rear surface 20 of the front fascia 12 to prevent accidental removal of the hook 52C from the slot 42, thereby securely retaining the support member 14 to the front fascia. The second mounting tabs 52 do not engage the grille member 16 when the grille member is connected to the front fascia 12 and to the support member 14.

The third mounting tab 54 of the support member 14 is received by one of the cut-outs 44 in the front fascia 12, as shown in FIG. 12, such that the third mounting tab 54 does not engage the front fascia 12.

The second mounting bosses 56 of the support member 14 are aligned with the third mounting holes 40 of the front fascia 12, as shown in FIGS. 12 and 21, such that the internally threaded openings 56A of the second mounting bosses 56 are aligned with the third mounting holes 40.

As shown in FIG. 12, the support member 14 surrounds three sides of the opening 30 in the front fascia 12. In other words, the first, second and third legs 34, 36 and 37 surround the lower and side portions of the perimeter of the opening 30. The support end 14 has a first end 14C and a second end 14D. The support member 14 extends along a perimeter of the opening 30 in the front fascia 12, as shown in FIG. 12. The second and third legs 36 and 37 of the support member 14 are received by the grooves 26C (FIG. 7) in the first and second connection members 26 and 28 when the support member 14 is connected to the front fascia 12.

After the support member 14 has been attached to a front surface side of the front fascia 12, the grille member 16 is attached to the rear surface side of the front fascia 12, as shown in FIG. 13, to form the front fascia assembly 10.

The first mounting holes 62 of the support member 16 are aligned with the first mounting bosses 46 of the support member 14 and the first mounting holes 36 of the front fascia 12, as shown in FIGS. 13 and 14. A fastener 72 is inserted through the first mounting hole 62 of the grille member 16, the first mounting hole 36 of the front fascia 12 and the first mounting boss of the support member 14, and preferably in that order, to securely retain the front fascia 12, the support member 14 and the grille member 16 together. The fastener 72 is received by the first mounting holes 36 in the connection members 26 and 28 of the fascia member 12. The fastener 72 is inserted from the rear surface side of the grille member 16. The fastener 72 is preferably threaded to engage the internally threaded opening 46A in the first mounting boss 46. The front surface 14A of the support member 14 covers the fastener 72 such that the fastener 72 is not visible from a front surface side of the front fascia assembly 10, thereby providing an aesthetic appearance.

The second mounting hole 64 of the grille member 16 receives the first locating member 48 of the support member 14, as shown in FIGS. 12 and 15. The first locating member 48 facilitates positioning the support member 14 with respect to the front fascia 12, thereby facilitating positioning the grille member 16 with respect to the front fascia 12 and the support member 14.

The third mounting holes 66 of the grille member 16 receive the first mounting tabs 50 of the support member 14, as shown in FIGS. 13 and 16. The hook 50A of the first mounting tab 50 flexes through the third mounting hole 66 and engages the rear surface 16B of the grille member 16, thereby preventing inadvertent or accidental removal of the first mounting tabs 50 from the third mounting holes 66. The first mounting tabs 50 pass through cut-outs 44 in the front fascia 12 such that the front fascia 12 does not receive the first mounting tabs 50 of the support member 14.

The third mounting slot 71 of the grille member 16 receives the third mounting tab 54 of the support member 14, as shown in FIG. 20. The third mounting tab 54 flexes as the third mounting tab 14 passes through the third mounting slot 71, such that the hook 54A of the third mounting tab 14 engages the rear surface 16B of the grille member 16 to prevent accidental removal of the third mounting tab 54 from the third mounting slot 71.

The fourth mounting holes 67 of the grille member 16 are aligned with the third mounting holes 40 of the front fascia 12 and the second mounting bosses 56 of the support member 14, as shown in FIGS. 13 and 21. A fastener 74 is inserted through the fourth mounting hole 67 of the grille member 16, the third mounting hole 40 of the front fascia 12 and the second mounting boss 56 of the support member 14, and preferably in that order, to securely retain the front fascia 12, the support member 14 and the grille member 16 together. The fastener 74 is inserted from the rear surface side of the grille member 16. The fastener 74 is preferably threaded to engage the internally threaded opening 56A in the second mounting boss 56. The front surface 14A of the support member 14 covers the fastener 74 such that the fastener 74 is not visible from a front surface side of the front fascia assembly 10, thereby providing an aesthetic appearance.

The support member 14 extends along a perimeter of the grille portion 60 of the grille member 16 from the first end 14C to the second end 14D, as shown in FIG. 13. The grille portion 60 covers the opening 30 in the front fascia 12, as shown in FIGS. 1, 9 and 13. The front fascia assembly 10 can then be attached to a vehicle.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the front fascia assembly for a vehicle. Accordingly, these terms, as utilized to describe the present invention should be interpreted relative to a vehicle equipped with the front fascia for a vehicle.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A front fascia for a vehicle comprising:
an upper fascia member;
a lower fascia member;
a connection member extending between the upper fascia member and the lower fascia member; and
a temporary connection member extending between the upper fascia member and the lower fascia member, the temporary connection member being configured to be removable prior to installation of the front fascia to the vehicle.

2. The front fascia according to claim 1, wherein
the temporary connection member is removable without a tool.

3. The front fascia according to claim 1, wherein
the temporary connection member has a first portion with a reduced thickness proximal the upper fascia member and a second portion with a reduced thickness proximal the lower fascia member, the first and second reduced thickness portions facilitating removal of the temporary connection member.

4. The front fascia according to claim 1, wherein
the upper fascia member, the lower fascia member, the connection member and the temporary connection member are integrally formed as a single member.

5. The front fascia according to claim 1, wherein
the upper fascia member, the lower fascia member, the connection member and the temporary connection member are formed as a single member by injection molding.

6. The front fascia according to claim 1, wherein
the first reduced thickness portion is disposed rearwardly of the second reduced thickness portion in a longitudinal direction of the vehicle.

7. The front fascia according to claim 1, wherein
the connection member is not parallel to the temporary connection member.

8. The front fascia according to claim 1, wherein
the temporary connection member extends substantially vertically in a front view of the front fascia.

9. The front fascia according to claim 1, wherein
the temporary connection member is substantially centered relative to a length of the upper fascia member.

10. The front fascia according to claim 1, wherein
the temporary connection member is substantially centered relative to a length of the lower fascia member.

11. A front fascia for a vehicle comprising:
an upper fascia member;
a lower fascia member;
a first connection member extending between the upper fascia member and the lower fascia member;
a second connection member extending between the upper fascia member and the lower fascia member; and
a temporary connection member extending between the upper fascia member and the lower fascia member, the temporary connection member being configured to be removable prior to installation of the front fascia to the vehicle.

12. The front fascia according to claim 11, wherein
the temporary connection member is removable without a tool.

13. The front fascia according to claim 11, wherein
the temporary connection member has a first portion with a reduced thickness proximal the upper fascia member and a second portion with a reduced thickness proximal the lower fascia member, the first and second reduced thickness portions facilitating removal of the temporary connection member.

14. The front fascia according to claim 11, wherein
the upper fascia member, the lower fascia member, the first connection member, the second connection member, and the temporary connection member are integrally formed as a single member.

15. The front fascia according to claim 11, wherein
the upper fascia member, the lower fascia member, the first connection member, the second connection member, and the temporary connection member are formed as a single member by injection molding.

16. The front fascia according to claim 11, wherein
the first reduced thickness portion is disposed rearwardly of the second reduced thickness portion in a longitudinal direction of the vehicle.

17. The front fascia according to claim 1, wherein
the temporary connection member is not parallel to the first connection member or to the second temporary connection member.

18. The front fascia according to claim 11, wherein
the temporary connection member extends substantially vertically in a front view of the front fascia.

19. The front fascia according to claim 11, wherein
the temporary connection member is substantially centered relative to a length of the upper fascia member and to a length of the lower fascia member.

20. The front fascia according to claim 11, wherein
the temporary connection member is disposed between the first connection member and the second connection member.

* * * * *